United States Patent Office 3,201,368
Patented Aug. 17, 1965

---

3,201,368
POLYOLEFINS STABILIZED WITH AN (ALKYL-PHENOL) MONOSULPHIDE AND A NICKEL ALKOXIDE
Charles H. Fuchsman, Cleveland Heights, Ohio, assignor to Ferro Corporation, Cleveland, Ohio, a corporation of Ohio
No Drawing. Filed Oct. 25, 1960, Ser. No. 64,706
6 Claims. (Cl. 260—45.75)

This invention relates to light stabilized polyolefin compositions, and more particularly to polyolefins which have been stabilized to the deleterious effects of ultraviolet light with a stabilizer composition composed of two or more separate ingredients hereinafter more particularly described.

The inertness of polyolefins under a variety of conditions has resulted in increasingly widespread use in diverse fields of application. One of the factors which limits its present usefulness in outdoor applications is the tendency to deteriorate under the influence of ultraviolet light present in sunlight. This deterioration is detectable in a number of ways, chief of which is an increase in brittleness and a decrease in elongation under tensile stress. These changes in the original characteristics of the polyolefin cause sheets or fibers of such materials when exposed to weather to break and tear readily. Utilization of these materials in sheet or fiber form, in covering greenhouses, draping open areas in building construction, etc., is consequently much reduced.

Attempts have been made to use various additives for the prevention of ultraviolet light deterioration of polyolefins. Thus, the addition of carbon black alone, or with antioxidants, reduces light deterioration. However, the resulting product is opaque to visible light and thus of limited utility. Other attempts to meet this problem have included admixture of various commercially available ultraviolet light absorbers with polyolefins. Some substituted benzophenones, which are excellent ultraviolet light absorbers, are very difficult to retain with admixture with polyolefins. These materials have, however, conferred insufficient light stability, or have proved largely incompatible with polyolefins, and have migrated to the surface of the plastics where they are readily removed by rain and wind-born abrasive dusts. Any unremoved efflorescence is unsightly and opaque.

It is the principal object of this invention, therefore, to provide improved polyolefin compositions better able to withstand the deleterious effects of prolonged exposure to ultraviolet light.

Other objects of this invention will appear as the description proceeds.

To the accomplishment of the foregoing and related ends, said invention, then, consists of the means hereinafter fully described and particularly pointed out in the appended claims, the following description setting forth in detail illustrative embodiments of the invention, such disclosed means constituting, however, but a few of the various forms in which the principle of this invention may be employed.

It has been found that certain bis-(p-alkylphenol) monosulphides in combination with certain nickel alkoxides provide a stabilizer composition possessing important light stabilization characteristics when used as an additive composition in polyolefins. Briefly stated, therefore, this invention comprises a polyolefin containing in intimate admixture therewith (a) from about 0.05% by weight of an o,o'-bis-(p-alkylphenol) monosulphide in which the alkyl group contains from 2 to 12 carbon atoms, and (b) from about 0.02% to 3% by weight of a nickel alkoxide of an alcohol containing from 2 to 18 carbon atoms and at least one functional group in addition to the carbonyl group, and which coacts in said polyolefin to preserve elongation and flexibility therein after exposure to ultraviolet light.

The term "stabilized" and various forms of the word used herein has reference to improvement to the ability of the treated material upon prolonged exposure to a destructive force to retain certain of its original characteristics. Thus, in the present case, there is an improvement in the ability of polyolefin compositions upon prolonged exposure to the destructive forces of ultraviolet light to retain flexibility and stretchability (elongation) in useful degrees. In the absence of the stabilizers of this invention, polyolefins, upon exposure to ultraviolet light, such as present in sunlight, rapidly become brittle and sheets thereof break or tear readily.

By the term "polyolefin" as used herein is meant normally solid polymers of $C_2$ to $C_6$ unsaturated aliphatic hydrocarbon monomers. The polymerizable monomers include, therefore, ethylene, propylene, butene-1, pentene-1, and 4-methyl-1-pentene. These polymers are usually colorless and have molecular weights which range from about 5,000 to about 2.5 million. In the presence of air and ultraviolet light they tend to lose desirable properties, particularly flexibility.

Although the stabilizer compositions of the present invention in the concentrations specified above perform well in polyolefins in general, for purposes of illustration this description will be confined to the presently commercially important polymers, low pressure, high density polyethylene, and crystalline polypropylene.

One of the classes of polyethylenes to which this invention is directed is characterized as follows: These polymers have a predominantly crystalline structure, X-ray diffraction readings showing 75% to 82% crystallinity; a number average molecular weight of 115,000 to 570,000, a melting point in the range of from about 120° to about 132° C., reduced specific viscosities in the range of 1.75 to about 6 and densities of 0.93 to 0.96. By the term "reduced specific viscosity" is meant the $\eta$ sp./c. determined on a solution of 0.1 g. of the polymer in 100 g. of Decalin at 135° C. by means of an Ubbelhode viscometer.

High density, low pressure polyethylenes having the foregoing characteristics may be prepared by the Ziegler process (Angew. Chem. 67:541 (1955)).

One of the classes of commercial polypropylenes to which the present invention is directed and in which stabilization against the deleterious effects of ultraviolet light exposure is achieved, is characterized as follows: The contemplated polymers have crystalline structure as determined by X-ray analysis; a number average molecular weight range of from about 45,000 to 100,000 and higher; a melting point in the range of from about 140° C. to about 170° C. when measured by a bi-refringence method, reduced specific viscosities (RSV) of about 1 to about 9, and densities of 0.87 to 0.93.

Crystalline polypropylenes having the foregoing characteristics may be prepared by any of the well-known processes of polymerizing propylene to a crystalline or isotactic polymer.

By one such process, crystalline polypropylenes having the foregoing characteristics are separated from a liquid phase bulk polymerization reaction mass. In general, polymerization is effected in the presence of certain metal-containing catalysts where the metal is of the 4th or 6th Group of the Periodic System. The reaction pressure ranges from atmospheric to as high as 30 atmospheres, and the temperature ranges between 20°C. and 150°C. solvent or diluent may be present, or the liquid monomer may be the only material present in addition to the catalyst. The reaction is conducted in the absence of oxygen and water. Various fractions of polymerized mass are separated by special sequential solvent treatment. Other methods of producing crystalline propylene may, of course, be employed. The polymers in the commercial form usually have other ingredients present in small amounts, e.g., heat stabilizers, and antioxidants. A particularly useful class of heat stabilizer is the group of polyalkyl - 2(2' - hydroxyphenyl) - 2, 2, 4 - trimethylchromans, polyalkyl - 4 - (2' - hydroxyphenyl) - 2, 2, 4-trimethylchromans and alkylidene-bis-(alkylphenol)s. The amount of such heat stabilizers is generally in the range of from 0.01% to about 5% by weight. The chromans may also be named as benzopyrans, and a specific example thereof is 2, 3-dihydro-2(2'-hydroxyphenyl)-1, 4-benzopyran. Other heat stabilizers include phosphite esters, and alkylidene bisphenols.

Inclusion of additives in highly crystalline polymeric materials poses problems, primary among which is the tendency of many additives to exude to the surface of the polymer. Certain substituted benzophenones which are excellent ultraviolet light absorbers are very difficult to retain in admixture with highly crystalline polyolefins.

A primary advantage of the stabilizer compositions of the present invention is their ability to confer stabilization and remain in compatible relationship with the polyolefin and other additives, e.g., antioxidants and/or heat stabilizers normally incorporated in minor amounts, e.g., less than about 5% by weight, in commercial polyolefins.

As indicated above, the stabilizer compositions of the present invention are composed of two essential ingredients, the first of which is a bis-(p-alkylpenol) monosulphide, and the second of which is a nickel alkoxide. It becomes convenient at this point to describe in greater detail each of these additive materials separately.

The alkylphenol monosulphides useful in accordance herewith are produced by sulphurizing a p-alkylphenol with a sulphurizing agent in an amount sufficient to provide a single atom of sulphur linking two aromatic nucleii in a position ortho to the phenolic hydroxyl group. This sulphurization is conveniently accomplished by means of reacting two moles of the alkylphenol with one mole of sulphur dichloride, $SCl_2$. The reaction is conveniently carried out in the presence of an inert solvent or diluent at the spontaneous temperature of the reaction, and preferably with agitation. Reflux temperature where a solvent is employed may, of course, be used.

This general method of production of monosulphide, useful in accordance herewith, as well as other sulphurization products including over- and under-sulphurized products and position isomers. It is a general characteristic of the over- and under-sulphurized materials that they are highly colored, usually a dark brown amorphous material. Moreover, the over-sulphurized materials, some of which are of polymeric nature, are very good solvents for the o, o'-monosulphides. Unless the latter monosulphides are separated from the other products of the reaction, so that a substantially colorless, high purity compound is obtained, utilization of the crude sulphurized product in the colorless polyolefin imparts colorizing ingredients which, even in the small quantities employed, undesirably affects the color of the resultant product. Hence, it becomes necessary to isolate from the reaction mixture, the o, o'-monosulphide which is desired. This separation may be effected either by high vacuum distillation procedures, or by conducting the sulphurization in the presence of a solvent system or medium in which the desired monosulphide is insoluble whereas the undesired over- and under-sulphurized materials remain soluble.

The example given below illustrates where such separation is based on differential solubility between the product and the by-product in a commercially available mixture of aliphatic hydrocarbons.

EXAMPLE 1

A solution of p-1, 1, 3, 3-tetramethylbutylphenol (200 grams) in $CCl_4$ (640 grams) is prepared at room temperature and then cooled to 45° F. with strong agitation. At this temperature the p-1, 1, 3, 3-tetramethylbutylphenol tends to come out of solution, but this is of little concern as long as the mixture is kept under agitation. Fifty grams of $SCl_2$ admixed and in solution of 50 grams of $CCl_4$ are added over a period of about 1 hour, and the mixture allowed to agitate for about an hour after the addition has ceased. After overnight standing, the mixture is washed with water to extract HCl, cooled and diluted with 200 grams of petroleum ether (B.P. 30°–60° C.). The more highly sulphurized product is soluble in petroleum ether. However, the o, o'-bis-(p-1, 1, 3, 3-tetramethylbutylphenol) monosulphide separates out as a crystalline white solid which is easily filtered. This is an example of an o, o'-bis-(p-octylphenol) monosulphide.

Alternatively, high vacuum distillation may be employed to separate out desired bis-(p-alkylphenol) monosulphides from reaction masses.

EXAMPLE 2

A solution of small p-tert.-amylphenol (125 grams, melting point 94.5–0° C.) in ethylene dichloride (630 grams) was heated to boiling under reflux and a solution of sulphur dichloride (40 grams) in ethylene dichloride (120 grams) was added slowly with agitation, the hydrogen chloride gas evolved during the reaction being removed through a reflux condenser. After the addition of the sulphur dichloride solution was complete, the reaction mixture was heated under reflux until no further emission of hydrogen chloride was detected, occupying a period of about 6 hours. The reaction mixture was then heated, finally under a vacuum of 0.15 mm. to 100° C., to remove the solvent and some unreacted p-tert.-amylphenol (8.4 grams). By this procedure there remained 130 grams of a light brown syrup. A portion of this reaction mixture (9.28 grams) was distilled and the following fractions were taken:

| | Grams |
|---|---|
| Forerun to 180° C./0/13 mm. | 1.30 |
| Fraction 1, 181–182° C./0/13 mm. | 1.62 |
| Fraction 2, 182° C./0/13 mm. | 1.48 |
| Fraction 3, 181–185° C./0/13 mm. | 2.64 |

Upon standing overnight Fractions, 1, 2 and 3 crystallized. The crystals were separated and recrystallized twice from hexane. Fractions 1 and 3 combined yielded 2.76 grams of bis-(p-tert.-amylphenol) monosulphide having a melting point of 99.5–100.5° C. Two recrystallizations of Fraction 2 yielded 1.10 grams of bis-(p-tert.-amylphenol)monosulphide having a melting point of 100.0–101.0° C. The analytical results on this product were: theoretical: carbon 73.70; hydrogen, 8.44; found: carbon 73.75; hydrogen 8.53.

In similar manner there may also be produced and purified o,o'-bis'(p-ethylphenol) monosulphide, o,o'-bis-(p-isopropylphenol) monosulphide, o,o'-bis-(p-tert.-butylphenol) monosulphide, o,o'-bis-(p-n-hexylphenol) monosulphide, o,o'-bis-(p-cyclohexylphenol) monosulphide, o,o'-bis-(p-2-ethylhexylphenol) monosulphide, o,o'-bis-(p-nonylphenol) monosulphide, o,o'-bis(p-decylphenol) mono-o-sulphide, o,o'-bis-(p-dodecylphenol) monosulphide, and other branched or normal alkylphenol monosulphides wherein the alkyl group contains from 2–12 carbon atoms, which compounds are also useful as the first essential ingredients of the stabilizing compositions of the present invention. The nonyl and dodecyl groups are branched groups whose basic structure may be conceived of as derived from the trimerization of propylene and isobutylene, respectively. Small quantities of ortho alkyl substituted rings and ortho-paradialkyl substituted rings are often found as impurities in the para-substituted phenols from which the monosulphides are produced. The presence of such impurities has not been found to have any effect on the efficacy of the monosulphides useful herein. Likewise, the presence of meta-alkyl substitution in the para-alkylphenol nucleus may be tolerated.

As indicated above, the second essential ingredient of the stabilizing composition of this invention is broadly a nickel alkoxide of an aliphatic alcohol having the general formula

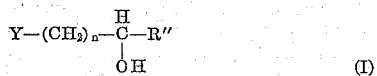  (I)

wherein Y is —SR', —OH, —OR' or —N(R')$_2$; R' is a hydrocarbon group or a radical composed of carbon, hydrogen and oxygen; R" is hydrogen, a hydrocarbon group, or a radical composed of carbon, hydrogen, and oxygen; and $n$ is 1 or 2. The structures which result from the interaction of a nickel carboxylate of a C$_2$ to C$_{30}$ carboxylic acid with an alcohol of Formula I above are believed to be of two types, or a mixture thereof:

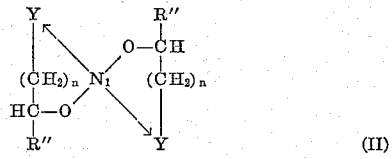  (II)

in which Ni is the common apex of two rings; and

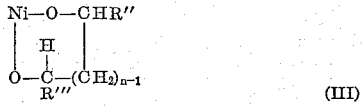  (III)

in which Ni is joined by primary valences to two points in the same molecule and R''' is R' or H. Co-ordinate valences are believed to exist on an intermolecular basis; e.g.,

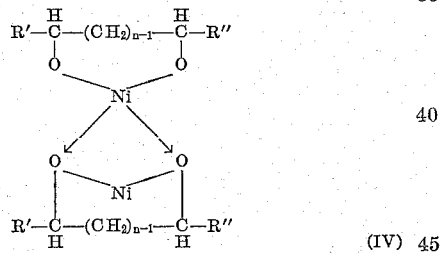  (IV)

In the following discussion the terms alkoxide and salt are used in a manner somewhat different from their conventional use in the literature, a condition arising from the unusual nature of the substances. It will be understood, therefore, that a substance including the structure:

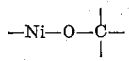

in which the unspecified valences of C are associated with C or H atoms (other than aryl C atoms) comprises a "nickel alkoxide" and, that the substance may be alternately referred to a nickel "salt" of the corresponding alcohol

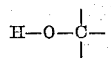

The nickel alkoxide useful in accordance herewith may be made by a metathetic reaction between the nickel halide, such as NiCl$_2$ and a sodium alkoxide. It has been found that certain of the nickel alkoxides useful in accordance with the present invention can be produced by a highly unexpected reaction between a nickel carboxylate such as, nickel acetate tetrahydrate and an alcohol which is characterized by the presence in the molecule of an organic functional group which is characterized by the presence therein of oxygen or sulphur. For example, nickel acetate tetrahydrate reacts in a 1:2 mole proportion with ethylene glycol to produce nickel di-(1-hydroxy ethylene oxide). In like manner, nickel acetate tetrahydrate reacts with thiodiethanol, diethylene glycol, 2-methyl-2,4-pentane diol, ethyl thioethanol, propylene glycol, thiodiproylene glycol, dihydroxyethylene ketone, etc., to produce nickel alkoxides which are of particular utility in accordance herewith. Specific illustrative examples of nickel alkoxides, some of which may be produced by the foregoing process, and some of which may be produced by other processes, e.g., a metathetic reaction include the nickel salt of di-(1-hydroxy ethylene imino ethylene oxide); the nickel salt of di-(1-hydroxy ethylene oxide); the nickel salt of di-(1-hydroxy ethoxy ethylene oxide); the nickel salt of di-(ethyl thioethylene oxide; the nickel salt of di-(N,N-diethylamino ethylene oxide) and other nickel alkoxides which will become readily apparent to those skilled in the art from a review of those which have been mentioned above, and the following disclosure. It should be noted that the ratio of atoms of Ni to molecules of alcohol need not be limited to 1:2, but may be varied to 1:1 or any intermediate ratio, depending on the number of OH groups in the alcohol and the general configuration of the molecule.

The reaction between the Ni carboxylate and the alcohol may be conducted in a solvent, or where the alcohol is liquid at reaction temperature, an excess of the alcohol may serve as the solvent. The reaction may be conducted at any pressure at which the carboxylic acid by-product may be conveniently vaporized. Sub-atmospheric pressures are preferred.

In the case of the reaction of nickel acetate tetrahydrate (A) with thiodiethanol (B), several variations were studied and were tabulated in Table I below

Table I

| Solvent | Mole ratio A:B | Max. Reaction Temp., °C. | Acid Recovered (percent of theory) |
|---|---|---|---|
| 1. None | 1:2 | 180 | 25 |
| 2. None | 1:2 | [1] 155 | 74 |
| 3. Xylene | 1:2 | [1] 195 | 68 |
| 4. Xylene | 1:1 | 140 | ([2]) |

[1] Under vacuum.
[2] Not measured.

It will be observed from Table I that the imposition of sub-atmospheric pressure tends to promote the reaction by assisting in the removal of the acetate from the reaction mass and limiting the amount of conversion to ester. The nickel analyses of the product produced in accordance with the 4 examples of Table I were very close to theoretical in all cases. The nickel alkoxides were readily separated from the reaction mass since the reaction product is xylene-soluble. The failure of the acid recovered to more nearly approach theoretical is attributable largely to the tendency of the acid to compete with the nickel carboxylate for reaction with the alcohol to form esters.

Other reactions of nickel acetate tetrahydrate in a mole ratio of 1:2 are tabulated in Table II below:

Table II

| Alcohol | Solvent | Max. Reaction Temp. | Percent Acid Recovered |
|---|---|---|---|
| Ethylthioethanol | Xylene | 142 | 65 |
| Diethleneglycol | None | 185 | 48 |
| Ethylene glycol | do | 150 | |
| 2-methyl,2,4-pentanediol | Xylene | 175 | 13 |
| Pentaerythritol | Xylene+di-methyl formamide | 165 | 53 |

In the case of ethylene glycol, the acid recovered was not measured quantitatively. However, the presence of acid was noted in the distillate, and the insoluble nickel acetate slowly disappeared going to a solution, another evidence of reaction.

It becomes convenient at this point to illustrate by specific examples a method by which compounds useful in accordance herewith may be prepared.

EXAMPLE 3

Nickel acetate tetrahydrate, 110 grams, and thiodiethanol, 107 grams were placed in a 3-necked flask fitted with an agitator, a condenser, a pot temperature thermometer and a vapor temperature thermometer. No solvent was employed. In the first phase of the reaction, water is driven off, this evolution occurring at temperatures between 80° and 98° C. When the temperature is within the range of from 85 to 95°, a deep green colored solution is obtained which gradually becomes lighter and turns to an almost white mass of pasty consistency. Heating is continued until the pot temperature reaches 125–135° C. in which ranges the pasty solid mass becomes fluid and returns to the dark green color. Heating is continued to a temperature of 183° C., and the system held under aspirator vacuum to remove acidic acid. The viscosity of the reaction mass increases. After the acidic acid has been removed, the contents of the flask are poured out into a pan and allowed to cool. There results a friable solid, dark green in color, which is pulverized to produce the additive material. This material contains 21.9% nickel, the theoretical content for the nickel di-(1-hydroxy ethylene-2,2'-thioethylene-1-oxide) being 19.52%. This product is slightly soluble in alcohol, acetone, methylethylketone, and xylene; and is soluble in very powerful solvents such as dimethyl formamide. If it is desirable to remove any remaining unreacted hydroxy compounds, or esters, the solids may be washed in cold alcohol. A similar purification step may be employed in the other preparations listed below.

EXAMPLE 4

Nickel acetate tetrahydrate, 138 grams, and ethyl thioethanol, 122 grams, and xylene, 750 ml. were heated together under reflux for a period of 3 hours, after which time 350 additional ml. of xylene were added and refluxing continued for a period of 1 hour. The resultant product was filtered, substantially the entire contents of the reaction flask passing through the filter paper. The dark green solution was stripped of solvent, and a solid material recovered in the manner set forth in Example 3 above. This product contained 23.05% nickel against a theoretical of 21.8% nickel for the nickel di-(ethyl thioethylene oxide). In the course of the reaction of this product, the reaction products pass through the characteristic green, very pale green, and back to dark green color transformation.

The foregoing examples illustrate a preferred method of preparation of nickel alkoxides useful in accordance herewith utilizing nickel acetate tetrahydrate. It should be understood that other nickel carboxylates can be used in place of that illustrated. Under the conditions of this reaction, the acid produced should be capable of removal from the zone of reaction, or otherwise being rendered of reduced influence upon the desired reaction. Thus any nickel carboxylate of a $C_2$ to $C_{30}$ carboxylic acid may be used, and useful products have been made from nickel acetate, nickel 2-ethyl hexoate, nickel laurate, nickel oleate, nickel naphthenate and nickel tallate, illustrating the broad range of carboxylic acids from which the nickel salts may be made. In removing the less volatile acids it is necessary after to distill under reduced pressure to avoid decomposition of the acid or of other reactants.

The alcohols from which the nickel alkoxides may be made by either of the methods above mentioned are as indicated above in Formula I. While primary alcohols are preferred, secondary alcohols may also be used as indicated in the specific examples. Thus, R" in Formula I may be hydrogen, or an alkyl group, such as methyl, ethyl, propyl, iso-propyl, butyl, t-butyl, amyl, t-amyl, hexyl, cyclohexyl, 2-ethyl hexyl, nonyl, decyl, dodecyl, cetyl; or, these alkyl groups may contain oxygen attached to two carbon atoms or to a single carbon atom. In the latter case the oxygen may be singly bonded to such carbon atoms as hydroxyl. R' includes the same radicals as mentioned above for R" with the exception of hydrogen. As indicated previously, the functional group Y is thioalkoxy, hydroxy, alkoxy, or dialkyl amino. The oxygen, sulphur or nitrogen characterizing the Y group is capable of co-ordinate covalent linkage with the nickel forming a very stable compound. Specific examples of nickel alkoxides have been illustrated above. Other nickel alkoxides useful in accordance herewith include: the nickel alkoxides, half and full, of each of thiodipropanol, diethylene glycol, butylthioethanol, butoxyethanol, cyclomethoxy ethanol, dimethylamino ethanol, triethanolamine, 1,3-butanediol, 1,3-dihydroxypentane, dicyclohexylamino ethanol; trimethyleneglycol, dipropylene glycol, 2,2-dimethylpropanediol-1,3; propylene glycol-1,2, butylene glycol-1,2, ethylene glycol-monoethyl ether, ethylene glycol monobutyl ether, ethylene glycol mono methyl ether; mono-ethyl-, and mono-butyl ethers of diethylene glycol, mono methyl-, etc. Six-membered rings are favored by nickel, i.e., where $n$ is 2, but five-membered rings (where $n$ is 1) are also formed without great difficulty.

Stabilizing compositions of the present invention contain a nickel alkoxide and an o,o'-bis'(p-alkylphenol) monosulphide in a weight ratio which ranges from about 1:10 to 10:1. For most purposes, however, weight ratios in the range of from 2:1 to 1:2, and most frequently 1:1 will be found entirely satisfactory for the purposes of this invention. It has been found that particularly valuable combinations are those in which the number of equivalents Ni metal present in the alkoxide greatly exceeds the number of equivalents of phenolic hydrogen in the sulphurized phenol. However other ratios within the range specified have been found useful. The stabilizer compositions are utilized in the polyolefins in such quantities as to provide from about 0.05% to about 5% by weight of the p-alkylphenol monosulphide and from about 0.02% to about 5% by weight of the nickel alkoxide by weight. The stabilizers used in accordance with this invention may be admixed with the polyolefins by any of the usual procedures for incorporation of an additive in a solid material. A simple method is to dissolve the additives in a low boiling solvent, such as, dimethyl formamide, and, after thoroughly mixing the solution with the polymer in flake or other such form, evaporating the solvent. Alternatively, these additive materials may be incorporated by various methods of mechanical mixing, or by dry mixing and extruding into molding powder, etc. The stabilizing composition of this invention may also be used in combination with other stabilizers, such as, ultraviolet light adsorbers, antiacids such as calcium soaps, or other antioxidants. Other materials may also be incorporated in the polymer as, for example, pigments, dyes, fillers, extenders, etc.

In order to illustrate examples of polyolefins containing the stabilizers of this invention, the following tabulation gives a number of specific examples of crystalline polypropylene composition containing examples of either one or both of the additives constituting the principal stabilizing composition of the present invention. The term "BOPS" signifies the o,o'-bis-(p-1,1,3,3-tetramethylbutylphenol) monosulphide. The legend "p.h.r." signifies parts per hundred parts of resin. Table III below gives the number of hours to failure in crystalline polypropylene with various additives, these tests having been conducted in fadometer, and failure being indicated by the sample sheet mils thick being examined periodically after the indicated number of hours exposure and flexed through 180°. When the sample broke or cracked, failure was noted.

Table III

| Controls | Additive | Concentration | Hrs. to Failure | P.h.r. Ni | P.h.r. BOPS |
|---|---|---|---|---|---|
| | BOPS (alkyl phenol) monosulphide. | 0.5 | 206 | .00 | .50 |
| Blank | None | | 85 | .00 | .00 |
| Ni additive without alkyl phenol monosulphide. | Ni half alkoxide of thiodiethanol. | 0.15 | 106 | .03 | |
| | do | 0.5 | 121 | .11 | |
| | do | 0.83 | 123 | .18 | |
| | Ni half alkoxide of diethylene glycol. | 0.5 | 85 | .10 | |
| | Ni half alkoxide of ethylthioethanol. | 0.5 | 83 | .12 | |
| | Ni half alkoxide of ethylene glycol. | 0.5 | 85 | .15 | |
| | Ni half alkoxide of diethylaminoethanol. | 0.5 | 108 | .11 | |
| Ni additive with alkyl phenol monosulphide (BOPS). | Ni half alkoxide of thiodiethanol 0.25+BOPS 0.5. | | 467 | .05 | .50 |
| | Ni half alkoxide of thiodiethanol 0.5+BOPS 0.5. | | 412 | .11 | .50 |
| | Ni half alkoxide of thiodiethanol 0.5+BOPS 0.25. | | 206 | .10 | .25 |
| | Ni half alkoxide of diethylene glycol 0.5+BOPS 0.5. | | 316 | .10 | .50 |
| | Ni half alkoxide of ethylthioethanol 0.5+BOPS 0.5. | | 432 | .12 | .50 |
| | Ni half alkoxide of ethylene glycol 0.5+BOPS 0.5. | | 316 | .15 | .50 |
| | Ni half alkoxide of diethylaminoethanol 0.5+BOPS 0.5. | | 226 | .11 | .50 |

The foregoing table illustrates the remarkable synergistic effect existing between the alkylphenol monosulphides and the nickel alkoxides included in the stabilizers of the present invention.

There has thus been provided a stabilized polyolefin composition which, by virtue of the inclusion of a minor amount of the stabilizer of the present invention, is enabled to withstand exposure to ultraviolet light for prolonged periods without becoming unduly brittle and inflexible. A further advantage of these compositions is that the degree of coloration added to the polymer by the amounts of the stabilizers indicated is such as to preserve much of the translucency and light color of the polymer. Of course, other ingredients may be added to the compositions of the present invention as indicated above, without substantially altering the manner in which the compositions of this invention operate. Crystalline polypropylene, polyethylene, polybutene-1, polypentene-1, etc., compositions stabilized in accordance herewith are useful in the form of extruded films or fibers, and as cast or molded articles. While we are not certain of the phenomena occuring by virtue of the inclusion of the stabilizers of the present invention, it is believed that embrittlement and loss of flexibility in the untreated polyalkylenes are the result of cross-linking and increase in molecular weight of the polymer under the influence of ultraviolet light, whether from an artificial or from a natural source. The stabilizer compositions of the present invention appear to have the ability to prevent cross linkage in the polymer.

Other modes of applying this invention may be employed instead of those specifically set forth above, changes being made as regards the details herein disclosed, provided the elements set forth in any of the following claims, or the equivalent of such, be employed.

It is, therefore, particularly pointed out and distinctly claimed as the invention:

1. A polyolefin homopolymer composition containing in intimate admixture therewith (a) from about 0.05% to 5% by weight of o,o'-bis-(p-1,1,3,3-tetramethylbutylphenol) monosulphide, and (b) from about 0.02% to 3% by weight of a nickel alkoxide of an alcohol having the general formula

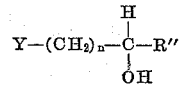

wherein Y is selected from the group consisting of —SR', —OH' and —OR'; R' is selected from the group consisting of a hydrocarbon group and a radical composed of carbon, hydrogen and oxygen; R" is selected from the group consisting of hydrogen, a hydrocarbon group, a radical composed of carbon, hydrogen, and oxygen; and $n$ is 1 or 2, the weight ratio of said alkoxide to said monosulphide being substantially about 2:1 to 1:2.

2. A composition in accordance with claim 1 in which (b) is a nickel alkoxide of thiodiethanol.

3. A composition in accordance with claim 1 in which (b) is a nickel alkoxide of ethylthioethanol.

4. A crystalline polypropylene homopolymer composition containing in intimate admixture therewith (a) from about 0.05% to 5% by weight of o,o'-bis-(p-1,1,3,3-tetramethylbutylphenol) monosulphide, and (b) from about 0.02% to 3% by weight of a nickel alkoxide of an alcohol having the general formula

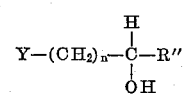

wherein Y is selected from the group consisting of —SR', —OH', and —OR'; R' is selected from the group consisting of a hydrocarbon group and a radical composed of carbon, hydrogen and oxygen; R" is selected from the group consisting of hydrogen, a hydrocarbon group, and a radical composed of carbon, hydrogen, and oxygen; and $n$ is 1 or 2, the weight ratio of said alkoxide to said monosulphide being substantially about 2:1 to 1:2.
5. A composition in accordance with claim 4 in which (b) is a nickel alkoxide of thiodiethanol.
6. A composition in accordance with claim 4 in which (b) is a nickel alkoxide of ethylthioethanol.

References Cited by the Examiner

UNITED STATES PATENTS 2,971,941  2/61  Fuchsman et al. _____ 260—45.75
2,971,968  2/61  Nicholson et al. _____ 260—45.75

OTHER REFERENCES

Lundberg, "Autoxidation and Antioxidants," volume II, page 937, Interscience Publishers, 1962.

LEON J. BERCOVITZ, *Primary Examiner.*

ALPHONSO D. SULLIVAN, *Examiner.*